United States Patent [19]

Bonanni

[11] Patent Number: 4,818,058
[45] Date of Patent: Apr. 4, 1989

[54] OPTICAL CONNECTOR
[75] Inventor: Rocco Bonanni, Wayne, N.J.
[73] Assignee: American Telephone and Telegraph Company AT&T Bell Laboratories, Murray Hill, N.J.
[21] Appl. No.: 163,690
[22] Filed: Mar. 3, 1988
[51] Int. Cl.$^4$ ............................................. G02B 6/36
[52] U.S. Cl. .............................. 350/96.20; 350/96.21
[58] Field of Search ............... 350/96.17, 96.20, 96.21, 350/96.22

[56] References Cited
U.S. PATENT DOCUMENTS

| | | | |
|---|---|---|---|
| 3,864,018 | 2/1975 | Miller | 350/96.21 |
| 4,279,468 | 7/1981 | Turley et al. | 350/96.21 |
| 4,475,790 | 10/1984 | Little | 350/96.21 |
| 4,515,434 | 5/1985 | Margolin et al. | 350/96.21 |
| 4,725,114 | 2/1988 | Murphy | 350/96.17 |
| 4,725,120 | 2/1988 | Parzygnat | 350/96.22 |

OTHER PUBLICATIONS

"Low-Loss Multifibre Connectors with Plug-Guide--Grooved Silicon", Satake et al., *Electronics Letters*, vol. 17, No. 22, pp. 828-830.
*Optical Fiber Splices and Connectors*, Calvin M. Miller, published by Marcel Dekker, Inc., 1986, pp. 336-338.

Primary Examiner—William L. Sikes
Assistant Examiner—Frank González
Attorney, Agent, or Firm—Lester H. Birnbaum

[57] ABSTRACT

Disclosed is a connector for optical fibers and components, and a method of manufacture, which provides close alignment. Each fiber is disposed within a plug comprising two blocks placed with their major surfaces in contact. Each block has an array of grooves formed in a major surface for accommodating the fibers. A pair of deeper grooves is also formed in each major surface at opposite edges of each block and at the same time as the array of grooves to form beveled edge surfaces. Guiding rods are disposed against the beveled surfaces so that the rods are rectilinear with the fibers.

10 Claims, 3 Drawing Sheets

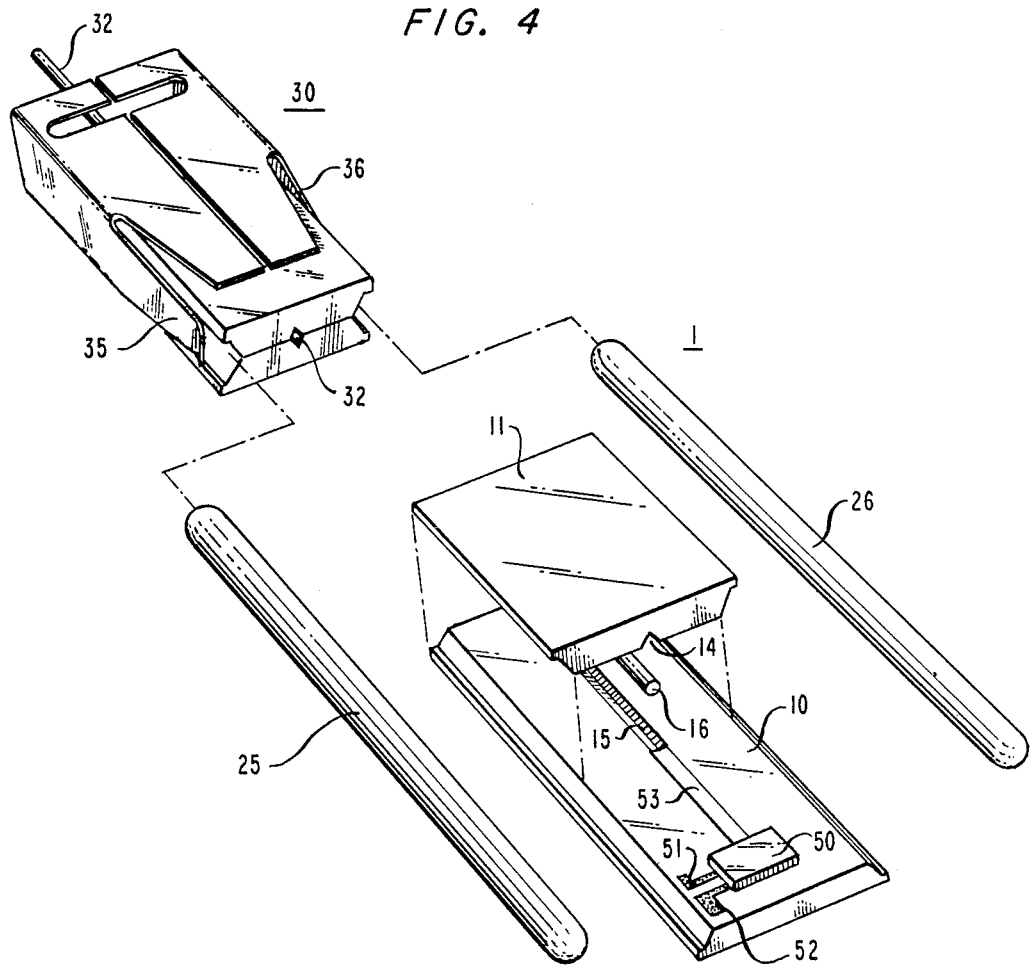

OPTICAL CONNECTOR

BACKGROUND OF THE INVENTION

This invention relates to optical fiber connectors.

Due to the increasing need for higher capacity data and voice transmission, use of optical fiber arrays is becoming necessary in many applications. Alignment of such fiber arrays either with other arrays or with optical components is troublesome, especially for the case of single mode fibers which have an extremely small core diameter (typically approximately 8 μm).

A typical connector for fiber arrays comprises two plugs of silicon with grooves formed therein for accommodating the fibers. Each plug is formed from two mated members which are bonded together to encase the fibers. The grooves are formed prior to bonding by anisotropically etching a major surface of each member in an array corresponding to the fibers so that when the members are bonded, each fiber lies in a groove which is precisely aligned with all other fibers in the array.

While the fibers within a plug may be fairly closely aligned with each other, a problem exists in aligning these fibers with another fiber array or with an array of optical components. One technique employs a precise thickness of each plug and a precise lapping of the edges of each plug for alignment of different plugs, aided by four springs, each contacting one of the major surfaces of the aligned plugs (see, e.g., U.S. Pat. No. 4,725,120 issued to Parzygnat). While effective in aligning the plugs, such precise machining of the plug surfaces is expensive. Another approach employs etching of deep grooves in the top and bottom surfaces of each plug and then aligning the two plugs by means of a chip extending between the two plugs and having ridges which fit within the grooves. (See, e.g., U.S. Pat. No. 3,864,018 issued to Miller). Again, precise machining of the plug surfaces is expensive. A still further approach employs grooves which are machined on the edges of the plugs and utilizes alignment pins pressed into the grooves by spring clips to bridge the gap between plugs (see, C. M. Miller, "Optical Fiber Splices and Connectors", pp. 336–338). Again, the alignment grooves have to be precisely machined with respect to the fiber grooves and this adds considerable expense to the connector.

An alternative approach is to form deeper alignment grooves in the same surfaces of the silicon members and at the same time as the fiber grooves. Guiding rods are pressed into the alignment grooves by spring plates and span the gap between plugs to provide the alignment (see, e.g., U.S. Pat. No. 4,279,468 issued to Turley).

It is, therefore, an object of the invention to provide a conector for optical fibers which will produce close alignment of the fibers with other fibers or optical components.

SUMMARY OF THE INVENTION

This and other objects are achieved in accordance with the invention, which in one aspect, is an optical fiber connector. The connector comprises a block of material with edge and major surfaces. The block includes at least one groove with sloping sidewalls formed in a major surface and adapted to receive an optical fiber. The block also includes a beveled portion extending from the major surface on each edge surface such that the slope of each beveled portion is the same as one of the sidewalls of the groove. A spline is disposed in contact with the beveled portion of at least one edge surface, extends beyond the plug, and is adapted for engagement with the beveled portion of a similar plug for alignment therewith. Means are also included for maintaining the spline in contact with the beveled portion.

In accordance with another aspect, the invention is a method of forming an optical fiber connector from a block material having major surfaces. A first groove is formed in a major surface of the block and is adapted for receiving an optical fiber therein. A pair of grooves is also formed in the major surface, one on either side of the first groove and essentially parallel therewith. The pair of grooves are deeper than the first groove and are formed essentially simultaneously with the first groove. The block of material is cut through a bottom portion of the pair of grooves and along a line essentially parallel with the first groove thereby forming edge surfaces including beveled portions extending from the major surface of the block which includes the first groove.

BRIEF DESCRIPTION OF THE DRAWING

These and other features of the invention are delineated in detail in the following description. In the drawing:

FIG. 4 is an exploded perspective view of a connector in accordance with a further embodiment of the invention.

It will be appreciated that for purposes of illustration, these figures are not necessarily drawn to scale.

DETAILED DESCRIPTION

Figure 1:
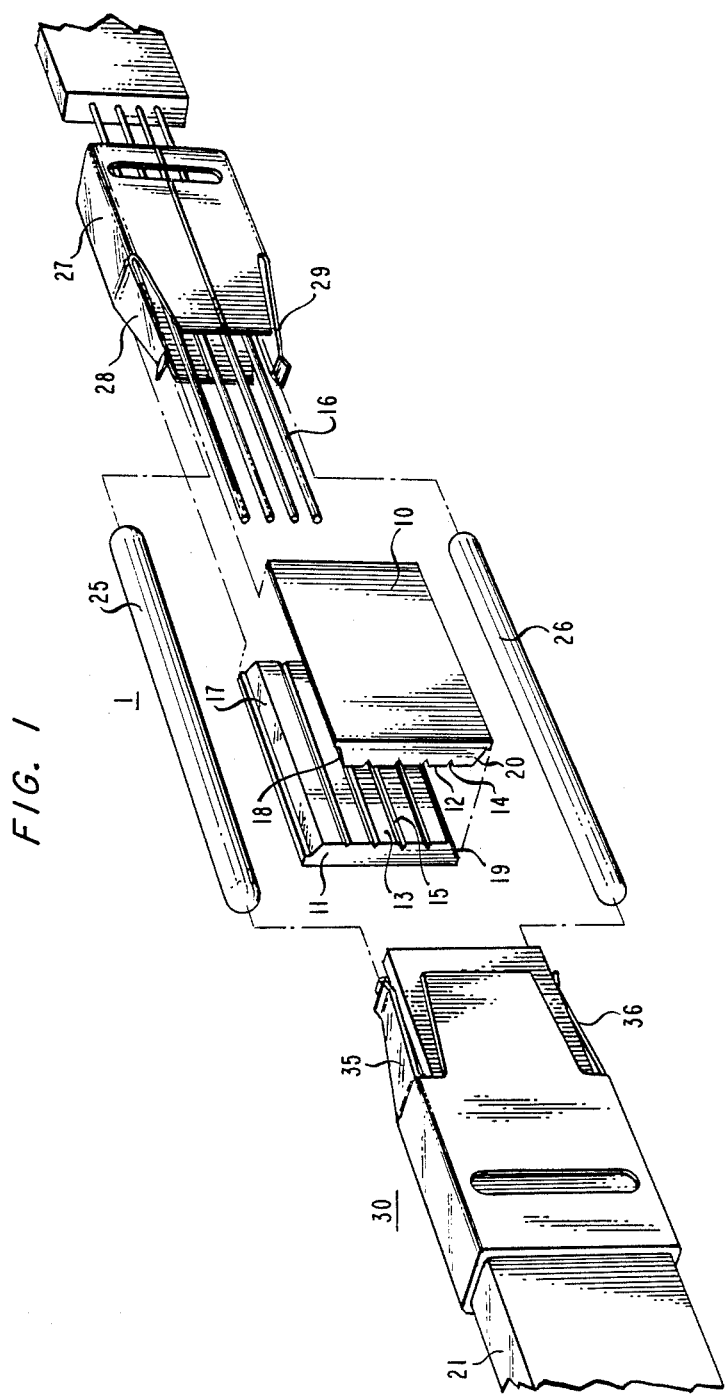
FIG. 1 is an exploded perspective view of a connector in accordance with one embodiment of the invention.
Figure 2:
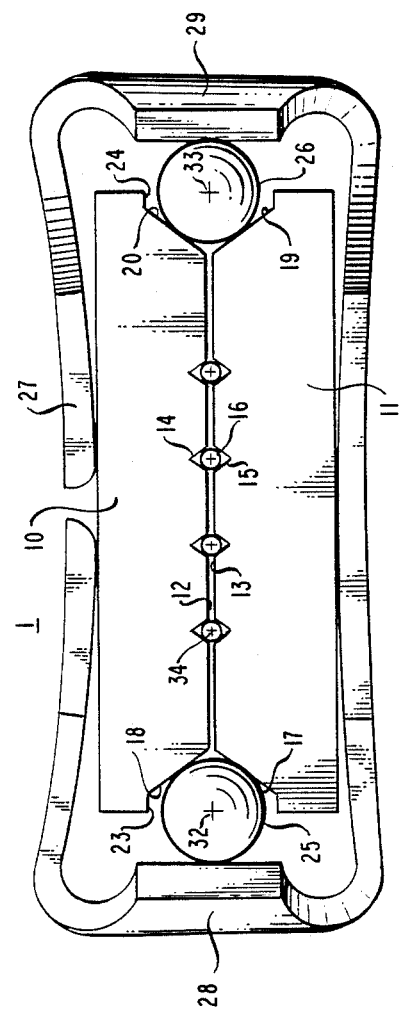
FIG. 2 is an end view of a portion of the connector of FIG. 1.

One form of the connector is illustrated in the exploded perspective view of FIG. 1 and the end view of FIG. 2. Each half connector (plug), e.g., 1, includes two blocks 10 and 11, of a material with facing major surfaces 12 and 13, respectively. The plugs are desirably made from a crystal material such as silicon, for reasons which will become clearer. Each major surface has an array of grooves, e.g., 14 and 15, etched therein. The grooves are of a size and shape so that when the two blocks are bonded together, corresponding grooves in each surface will accommodate an optical fiber, e.g., 16, from an array of fibers to be connected (see FIG. 2). Each fiber will make contact with the sloped surfaces of the two corresponding grooves from the blocks as shown.

Use of a crystal for the block material permits taking advantage of certain crystal planes to precisely form the groove surfaces. For example, a silicon block with a major surface in the (100) crystallographic plane will be etched anisotropically to form grooves with surfaces lying in the (111) planes. Therefore, the angle of the two sloping walls of a groove will always be precisely determined by the orientation of the crystal planes (in this example, approximately 55°) with respect to the major structure regardless of the time of etching the major surface. The size of the opening will therefore primarily be determined by the size of the openings in the etch mask. Even if some overetching or underetching of the grooves should occur, the angles of the groove walls will remain the same and the position of each fiber will shift with respect to the major surface of the block by the same amount. Thus, the fibers will always be rectilinear.

It will be appreciated that while the grooves are shown with a "V" configuration, it is also possible to achieve grooves with a flat bottom by stopping the etching short of a complete etching of the crystal planes. However, sloping sidewalls with the same orientation will still be produced.

While the fibers in each plug are closely aligned with each other, mating such a member with the other plug of the connector of the same construction (30 of FIG. 1) to make the connection to another fiber array (within fiber ribbon 21) presents a serious problem. This is due to the fact that the grooves of the blocks making up the other plug, 30, may not have been etched to precisely the same extent as those of the plug 1. Hence, the two fiber arrays may be shifted with respect to their respective block surfaces and therefore misaligned. This problem is especially acute when the fibers are single mode fibers since they have an extremely small core diameter (typically 8 $\mu$m).

In accordance with a main feature of the invention, alignment between the fiber arrays is provided by forming beveled portions (17, 18, 19 and 20) on each edge surface of each block 10 and 11 (the beveled surfaces are similarly formed on the blocks of plug 30). The beveled portions extend from the major surfaces (12 and 13) of each block and have the same slope as the groove surfaces.

Figure 3:
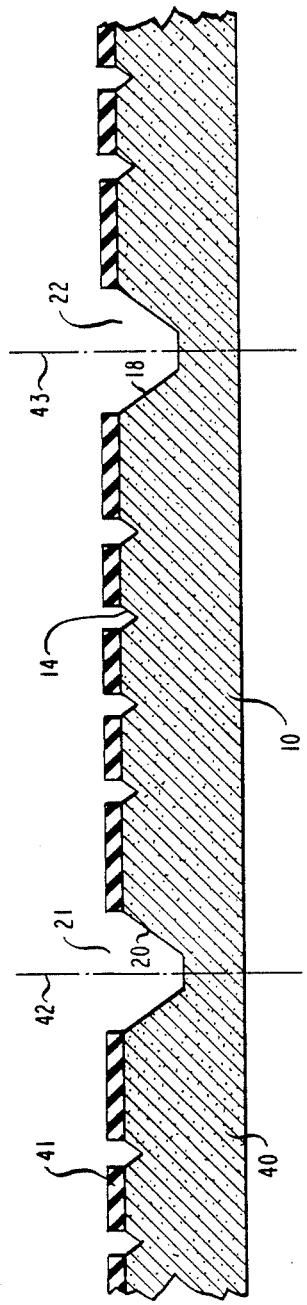
FIG. 3 is a cross-sectional view of a portion of the connector during a stage of fabrication in accordance with an embodiment of the method of the invention.

Such beveled portions can be formed as illustrated in FIG. 3. Each block, such as 10, is formed from a larger silicon wafer 40. A standard mask material, 41, such as thermally grown $SiO_2$ deposited over the major surface of the wafer which is the (100) crystallographic plane. The mask openings are formed by standard photolithographic techniques to expose the areas of silicon where the fiber grooves will be etched. Wider mask openings are also formed over the silicon areas adjacent to the fiber grooves (one on each side of the array). Typically, the openings for etching the fiber grooves are approximately 140 $\mu$m wide, while the openings for etching the larger grooves are approximately 1000 $\mu$m wide. A standard anisotropic etchant is then applied to the structure to form the fiber grooves (e.g., 14) and deeper grooves 21 and 22 adjacent thereto. The deeper grooves include side walls, e.g., 18 and 20, which have the same slope as the fiber grooves since they are formed by the same anisotropic etch along the same crystal planes (the (111) plane). The fiber grooves would be typically approximately 98 $\mu$m deep while the adjacent grooves (21 and 22) would be approximately 500 $\mu$m deep.

With certain etchants, such as ethylene diamine pyrocatechol (EDP), it is possible to etch both sets of grooves in a single step, since no significant undercutting of the mask is produced for the fiber grooves while the deeper grooves are being etched. An etchant which tends to undercut the mask, such as KOH can still be used in a single step if the mask openings over the fiber groove area are made sufficiently narrow to take this undercutting into account. Alternatively, the two sets of grooves can be formed in two etching steps. For the first step, mask openings would be formed only over the area of the deeper grooves and those areas would be etched to a predetermined depth short of the desired depth for those grooves. Openings in the mask would be made over the area comprising the fiber grooves, and these fiber grooves would then be etched to their desired depth while the etching of the deeper grooves would be completed (see U.S. Patent application of G. E. Blonder, filed concurrently herewith).

After the etching of the grooves, the mask is stripped off. The wafer is then cut into individual blocks by sawing through the etched surfaces of the deeper grooves 21 and 22 along lines illustrated as 42 and 43. The saw lines extend substantially the entire length of the deeper grooves (into the plane illustrated in FIG. 3) and substantially parallel to the longitudinal dimension of the fiber grooves. When the sawing is complete, a plurality of block such as 10 of FIGS. 1 and 2 are produced with beveled surfaces (e.g., 18 and 20) formed from one wall of the deep grooves on either side of the fiber grooves. The plugs also include ledge portions, 23 and 24, FIG. 2 formed from part of the bottom surface of the deep grooves. These ledge portions can remain as shown or can be removed if desired.

Returning to FIGS. 1 and 2, the blocks are assembled by placing each fiber of the array within its corresponding groove and mating the two blocks 10 and 11 to form the appropriate housing for each fiber (FIG. 2). The two major surfaces are bonded together by standard means such as epoxy.

In order to align and couple the plug 1 of FIGS. 1 and 2 with a similarly formed plug 30, elastically loaded splines in the form of guiding rods 25 and 26 are utilized. Each rod is held in contact with the beveled portions 17, 18, 19 and 20 of a corresponding edge surface of the plug 1. The rods also extend beyond the front surface of the plugs so that each rod can be slid into contact with the beveled portions of the edge surfaces of the other plug 30. The splines as shown are in the form of rods which are essentially cylindrical in shape but can be tapered at one end for easy insertion. However, the splines can be any member briding the gap between plugs which can be held in contact with and align the beveled portions.

The rods, 25 and 26, are spring loaded to maintain intimate contact with the beveled portions. In this example, the spring force is provided by means including a clip portion 27 extending around the two plugs (except for a narrow gap). Extending from the clip are a pair of prongs 28 and 29, each adjacent to a corresponding edge surface of the assembled plug but maintaining a slight gap therewith which is smaller than the diameter of the rods. The rods are inserted in this gap and held against the beveled portions of the edge surfaces by the spring force created by the prongs 28 and 29. This force is essentially parallel to the major surfaces of the blocks 10 and 11 and tends to pull the blocks apart but for the presence of the Clip portion. Since the rods are in a fixed position against the beveled portions and the beveled portions are etched at the same time and along the same crystallographic planes as the fiber grooves, the center axes (32 and 33 of FIG. 2) of the rods will be in line with all the center axes (e.g., 34) of the fibers. That is, the rods and fibers are rectilinear. This will be the case regardless of any overetching or underetching of the two blocks 10 and 11 during the formation of the grooves since any shift in the position of the fibers relative to the major surface of the blocks will be experienced to the same extent by the guiding rods.

The guiding rods are inserted within the gaps formed between the prongs 35 and 36 and the beveled portions (not shown) of the edge surfaces of the blocks of the other plug 30 until the front faces of the plugs are in physical contact. (The spring means of the two plugs are typically identical.) The rods 25 and 26 are, therefore, pressed into intimate contact with the beveled surfaces of both plugs 1 and 30. Since the rods are rectilinear with the fibers of the plug 1 as discussed previously, and the beveled portions of the other plug 30 are also formed at the same slope as the fiber grooves of that plug, it follows that when rods 25 and 26 are pressed against the beveled portions of plug 30 they will also be rectilinear with the fibers of that plug and that the two fiber arrays will be in complete alignment. This will be the case regardless of the amount of overetch or underetch of the silicon blocks forming either plug. It will be appreciated that, although two guiding rods, 25 and 26, are shown as attached to one plug (1), if desired, one rod could be attached to one of the edge surfaces of each plug 1 and 30, prior to mating.

While the invention has been described with regard to connecting two fiber arrays, it should be appreciated that the principles are applicable to connecting single fibers together or connecting one or more fibers to one or more optical components. For example, as shown in FIG. 4, the plug 1, can be formed as before but with one of the silicon blocks 10 being extended so that a semiconductor laser 50 can be formed on the major surface along with contacts 51 and 52 and a waveguide 53. Of course, other types of components, such as receivers, can be formed on the surface. The other plug, 30, can be formed as before, but this time enclosing a single fiber 32, and retaining the rods 25 and 26. When the two plugs are mated as before, the fiber, 32, will meet a fiber, 16, preinserted within the groove formed by the two silicon blocks 10 and 11 of plug 1 which latter-fiber is in contact with the waveguide 53 formed up to the edge of the groove. The rods will be held against the beveled portions of plugs 1 and 30 by the prongs 35 and 36 of plug 30 (i.e., no spring is needed around blocks 10 and 11. Thus, connection between the fiber 32 and laser 50 is established with a close alignment of course, a plurality of fibers within each plug may also be connected with this type of arrangement.

Various additional modifications will become apparent to those skilled in the art. All such variations which basically rely on the teaching through which the invention has advanced the art are properly considered within the scope of the invention.

What is claimed is:

1. An optical fiber connector comprising:
    a block of material with edge and major surfaces, said block including at least one groove formed with sloping sidewalls in a major surface and adapted to receive therein an optical fiber, said block also including a beveled portion extending from the major surface on each edge surface such that the slope of each beveled portion is the same as one of the sidewalls of the groove;
    a spline disposed in contact with the beveled portion of at least one edge surface, extending beyond said block, and adapted for engagement with the beveled portion of a similar block for alignment therewith; and
    means for maintaining the spline in contact with the beveled portion.

2. The device according to claim 1 wherein the major surface of the block includes a plurality of grooves adapted to receive an array of optical fibers.

3. The device according to claim 1 further comprising a second block with edge and major surfaces and with at least one groove having sloping sidewalls in a major surface, said block also including a beveled portion extending from the major surface on each edge surface such that the slope of each beveled portion is the same as one of the sidewalls of the groove;
    said second block having its major surface in contact with the major surface of the first block to that the two grooves form a housing for the optical fiber therein and the spline is in contact with the beveled portions of both blocks at one edge.

4. The device according to claim 1 wherein the block comprises silicon and the groove sidewalls and beveled portions are etched along the (111) crystallographic planes of the block.

5. The device according to claim 3 wherein the central axes of the fiber and the rod are rectilinear.

6. The device according to claim 4 wherein the beveled portions of the block and the groove are formed at the same time by anisotropically etching the major surface.

7. The device according to claim 3 wherein the spline is held in contact with the beveled portions by a spring force applied to the spline which is essentially parallel with the major surfaces of the blocks.

8. A method of forming an optical fiber connector from a block material having major surface comprising the steps of:
    forming a first groove in a major surface of the block adapted for receiving an optical fiber therein;
    forming a pair of grooves in said major surfaces, one on either side of said first groove and essentially parallel therewith, said pair being deeper than the first groove and being formed essentially simultaneously with the first groove; and
    cutting said block of material through a bottom portion of said pair of grooves and along a line essentially parallel with the first groove thereby forming edge surfaces including beveled portions extending from the major surface of the block which includes the first groove.

9. The method according to claim 8 wherein the block comprises silicon, the major surface lies in the (100) crystallographic plane, and the walls of the grooves are formed in the (111) crystallographic planes.

10. The method according to claim 8 wherein the deep groove is first etched to a predetermined depth, and the deep grooves and the first groove are then etched simultaneously.

* * * * *

REEXAMINATION CERTIFICATE (2549th)
United States Patent [19]
Bonanni

[11] B1 4,818,058
[45] Certificate Issued Apr. 25, 1995

[54] OPTICAL CONNECTOR

[75] Inventor: Rocco Bonanni, Wayne, N.J.

[73] Assignee: Bell Telephone Laboratories, Incorporated, Murray Hill, N.J.

Reexamination Request:
No. 90/003,387, Mar. 14, 1994

Reexamination Certificate for:
Patent No.: 4,818,058
Issued: Apr. 4, 1989
Appl. No.: 163,690
Filed: Mar. 3, 1988

[51] Int. Cl.⁶ .............................. G02B 6/36
[52] U.S. Cl. ........................ 385/71; 385/59; 385/72
[58] Field of Search .................... 385/71, 72, 59

[56] References Cited
FOREIGN PATENT DOCUMENTS

| | | | |
|---|---|---|---|
| 55-45051 | 3/1980 | Japan | G02B 7/26 |
| 57-58112 | 4/1982 | Japan | G02B 7/26 |
| 61-61111 | 3/1986 | Japan | G02B 6/40 |

*Primary Examiner*—Frank González

[57] ABSTRACT

Disclosed is a connector for optical fibers and components, and a method of manufacture, which provides close alignment. Each fiber is disposed within a plug comprising two blocks placed with their major surfaces in contact. Each block has an array of grooves formed in a major surface for accommodating the fibers. A pair of deeper grooves is also formed in each major surface at opposite edges of each block and at the same time as the array of grooves to form beveled edge surfaces. Guiding rods are disposed against the beveled surfaces so that the rods are rectilinear with the fibers.

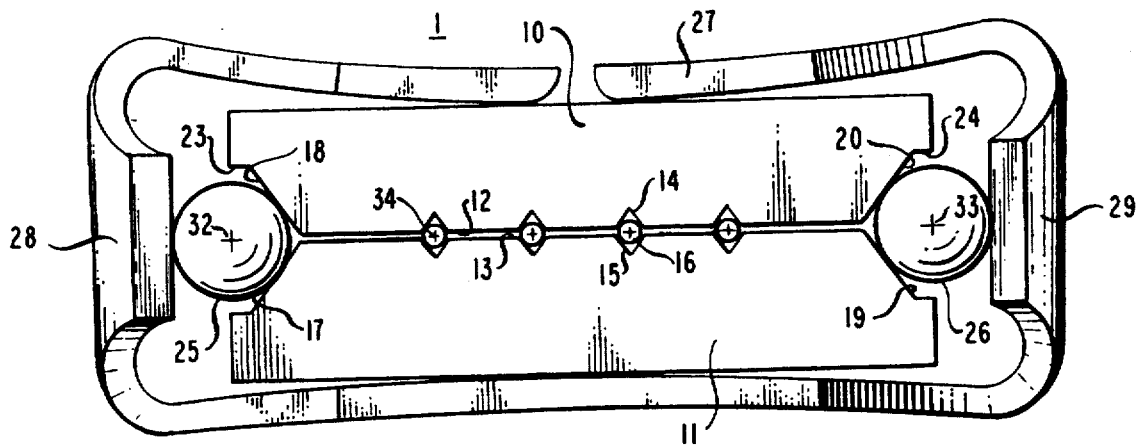

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3, 5, 7 and 10 are cancelled.

Claims 1, 2, 4, 6 and 8 are determined to be patentable as amended.

Claim 9 dependent on an amended claim, is determined to be patentable.

1. An optical fiber connector comprising:
  a first block of material with edge and major surfaces, said block including at least one groove formed with sloping sidewalls in [a] *at least one of said* major [surface] *surfaces* and adapted to receive therein an optical fiber, said block also including a beveled portion extending from [the] *said at least one* major surface on each edge surface such that the slope of each beveled portion is the same as one of the sidewalls of the groove;
  a second block with edge and major surfaces and with at least one groove having sloping sidewalls in [a] *at least one of said* major [surface] *surfaces*, said block also including a beveled portion extending from [the] *said at least one* major surface on each edge surface such that the slope of each beveled portion is the same as one of the sidewalls of the groove,
  said second block having its *said at least one* major surface in contact with the *said at least one* major surface of the first block to that the two grooves form a housing for the optical fiber therein;
  a spline disposed in contact with the beveled portions of both blocks at one edge, extending beyond said block, and adapted for engagement with the beveled portion of similar blocks for alignment therewith; and
  means *for urging the said major surfces together and* for maintaining the spline in contact with the beveled portions comprising a spring force applied to the spline which is essentially parallel with the *said* major surfaces of the blocks such that the central axes of the fiber and the [rod] *spline* are rectilinear.

2. The device according to claim 1 wherein the major [surface] *surfaces* of the [block includes] *blocks include* a plurality of grooves adapted to receive an array of optical fibers.

4. The device according to claim 1 wherein the [block comprises] *blocks comprise* silicon and the groove sidewalls and beveled portions are etched along the (111) crystallographic planes of the [block] *blocks*.

6. The device according to claim 4 wherein the beveled portions of the [block] *blocks* and the [groove] *grooves* are formed at the same time by anisotropically etching the major [surface] *surfaces*.

8. A method of forming an optical fiber connector from a block material having major surfaces comprising the steps of:
  forming a first groove in [a] *at least one of said* major [surface] *surfaces* of the block adapted for receiving an optical fiber therein;
  forming a pair of grooves in said *at least one* major [surfaces] *surface*, one on either side of said first groove and essentially parallel therewith, said pair being deeper than the first groove and being formed by first etching the deep grooves to a predetermined depth, and then etching the deep grooves and the first groove simultaneously; and
  cutting said block of material through a bottom portion of said pair of grooves and along a line essentially parallel with the first groove thereby forming edge surfaces including beveled portions extending from the major surface of the block which includes the first groove.

* * * * *